United States Patent [19]
Wada

[11] Patent Number: 5,602,879
[45] Date of Patent: Feb. 11, 1997

[54] CLOCK RECOVERING CIRCUIT FOR DIGITAL DEMODULATOR

[75] Inventor: Yoshio Wada, Kanagawa, Japan

[73] Assignee: Toyo Communication Equipment Co., Ltd., Kanagawa, Japan

[21] Appl. No.: 256,841

[22] PCT Filed: Mar. 9, 1994

[86] PCT No.: PCT/JP94/00370

§ 371 Date: Jul. 26, 1994

§ 102(e) Date: Jul. 26, 1994

[87] PCT Pub. No.: WO94/21073

PCT Pub. Date: Sep. 3, 1994

[30] Foreign Application Priority Data

Mar. 10, 1993 [JP] Japan ................................ 5-76127

[51] Int. Cl.⁶ ............................................... H04L 7/00
[52] U.S. Cl. .................................... 375/355; 327/299
[58] Field of Search .............................. 375/94, 96, 106, 375/118, 97, 74, 80, 84, 85, 355, 343, 342, 371, 354; 328/109, 72; 307/510, 353; 364/728.03

[56] References Cited

U.S. PATENT DOCUMENTS

| | | | |
|---|---|---|---|
| 4,692,931 | 9/1987 | Ohsawa | 375/355 |
| 4,815,103 | 3/1989 | Cupo et al. | 375/106 |
| 5,016,206 | 5/1991 | Shinonaga | 375/116 |
| 5,093,841 | 3/1992 | Vancraeynest | 375/365 |
| 5,202,901 | 4/1993 | Chennakeshu et al. | 375/84 |
| 5,255,289 | 10/1993 | Tomita | 375/355 |
| 5,259,005 | 11/1993 | La Rosa et al. | 375/355 |
| 5,283,815 | 2/1994 | Chennakeshu et al. | 375/84 |
| 5,309,482 | 5/1994 | Wright et al. | 375/106 |
| 5,311,544 | 5/1994 | Park et al. | 375/106 |
| 5,343,498 | 8/1994 | Toy et al. | 375/355 |
| 5,425,057 | 6/1995 | Paff | 375/326 |
| 5,504,785 | 4/1996 | Becker et al. | 375/344 |

FOREIGN PATENT DOCUMENTS

| | | |
|---|---|---|
| 61-205053 | 9/1986 | Japan . |
| 63-246060 | 12/1988 | Japan . |
| 2-272840 | 11/1990 | Japan . |

*Primary Examiner*—Tesfaldet Bocure
*Attorney, Agent, or Firm*—Koda and Androlia

[57] ABSTRACT

A clock recovering circuit including a correlation detection circuit for sampling a signal of a plurality of sampling points fixed in advance for each unit data cycle and detecting correlations between each adjacent pair of the sampling points, a correlation judgment circuit for comparing the correlations detected by the correlation detection circuit, judging the pair of sampling points which maximize the correlation and another pair of sampling points providing the next largest correlation and producing a timing clock signal based on the sampling point which is a common sampling point with respect to the two pairs of sampling points providing the largest and the next largest correlation, and a phase shift circuit for shifting the phase of the signal so as to equalize the correlations of the two pairs of sampling points so that the timing clock signal which is produced by the common sampling points is always generated at a point at which an eye pattern of the signal opens most widely.

4 Claims, 19 Drawing Sheets

| A | B | C |
|---|---|---|
| 0 | 0 | 0 |
| 0 | 1 | 1 |
| 1 | 0 | 1 |
| 1 | 1 | 0 |

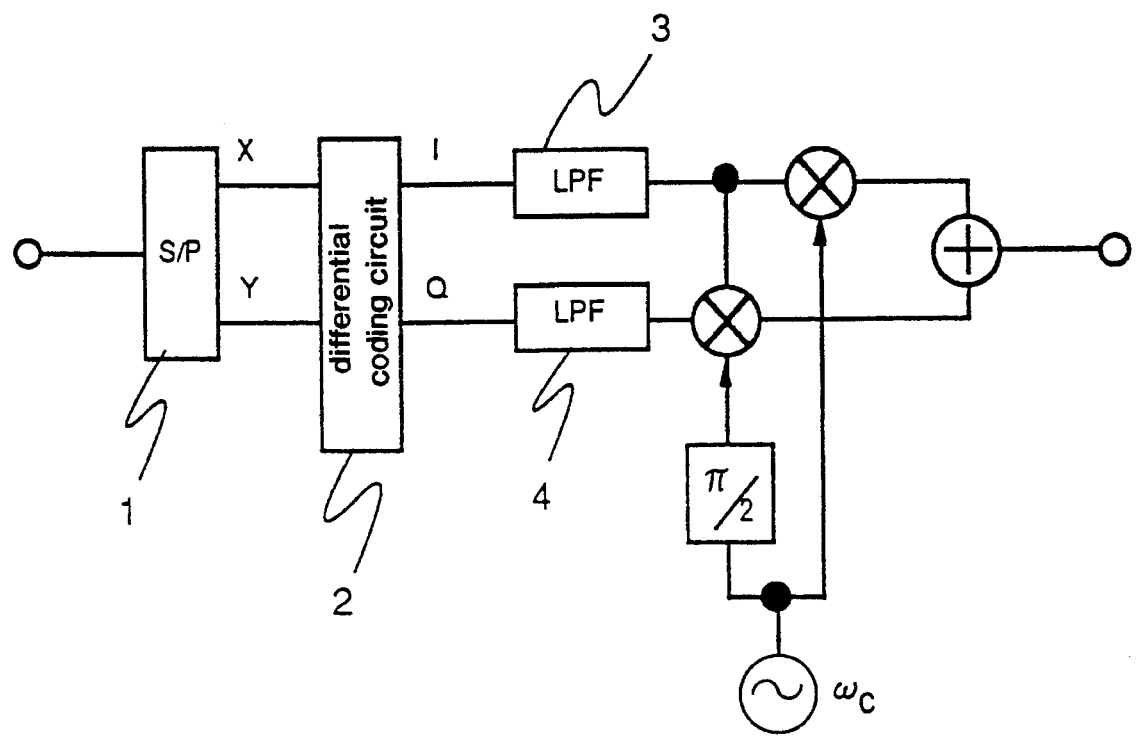
FIG. 16
PRIOR ART
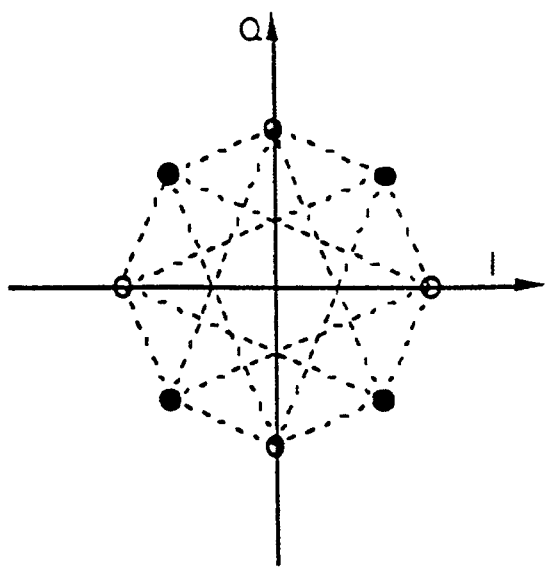
FIG. 17(a)
PRIOR ART
| X | Y | ΔΦ |
|---|---|---|
| 0 | 0 | +π/4 |
| 0 | 1 | +3π/4 |
| 1 | 0 | -π/4 |
| 1 | 1 | -3π/4 |
FIG. 17(b)
PRIOR ART

CLOCK RECOVERING CIRCUIT FOR DIGITAL DEMODULATOR

BACKGROUND OF THE INVENTION

1. Field of the Invention

The present invention relates to a digital demodulator for demodulating signal waves modulated by digital signals, and also relates to AFC (Automatic Frequency Control) circuits, clock recovery circuits and bit error estimation circuits respectively used for that digital demodulator.

2. Prior Art

Digitization of communication has been studied and realized in the field of data transfer for communication on wires, such as telephone circuits, microwave communication or optical communication between base stations. Also, digitization of mobile communication for automobile telephones or portable telephones whose development has been delayed so far is studied extensively.

As the well-known method of modulating or demodulating digital signals, there can be mentioned the amplitude modulation for changing the amplitude of carrier waves corresponding to state of each digital signal and the so-called angle modulation for changing its phase or frequency.

In the field of digital mobile communication, generally, the angle modulation method which is not susceptible to amplitude distortion due to the signal transfer route is used.

The angle modulation is now described in brief with respect to the so-called π/4 shift quadrature phase shift-keying (π/4 shift QPSK) method which is excellent in withstandability to distortion and suitable for the mobile communication.

FIG. 16 is a block diagram showing fundamental construction of the π/4 shift QPSK system.

Serial/parallel converter 1 converts a row of binary digital data into 2-bit unit data (X, Y). The unit data is called one symbol used as one cycle of data processing. Differential coding circuit 2 produces a base band signal consisting of I and Q channels to which the information of (X, Y) is given respectively corresponding to the change (difference) in signals. The band of the base band signal is limited by low-pass filters (LPF) 3, 4. Thus, amplitude modulation is carried out by multiplying the in-phase and quadrature phase components of carrier wave $\omega_c$ by the band-limited base band signal respectively, and a modulation wave is then obtained by synthesizing both the products.

In case of the phase modulation by the above π/4 shift QPSK system, amplitude values "A", "−A" are assigned respectively to the binary signals "1", "0", and four signal-point data (I, Q) are given for one symbol to perform the quadrature phase shift keying. Namely, as shown by the signal-point arrangement with respect to I, Q in FIG. 17, the phase modulation is performed using the signal-point arrangement of QPSK designated by blackened circles (●) and the corresponding π/4 shifted signal-point arrangement designated by normal circles (○) alternately at each symbol interval. Accordingly, each phase difference ΔΦ between the two consecutive symbols always becomes odd times the shift of π/4 so that the relation between ΔΦ and the input unit data (X, Y) can be expressed as shown in FIG. 17(b).

As the method of demodulating a modulation wave, the synchronous detection method and delay detection method are well-known. Theoretically, the synchronous detection method has excellent properties, but is likely to generate disadvantageously high-speed fading. Thus, the delay detection method is more preferred, in particular, in case of digital mobile communication where a sudden phase change often occurs.

In the delay detection method, a new modulation wave is detected based on the previous modulation wave delayed by a delay circuit provided with a predetermined delay time. Therefore, these modulation waves should be modulated by a signal processed by the differential coding as described above. In addition, the regeneration of the carrier wave becomes unnecessary. Accordingly, as compared to the synchronous detection method, the delay detection method can be constructed more simply and more suitable for the mobile communication.

For example, in case of the aforementioned π/4 shift QPSK, the phase difference ΔΦ between any given two consecutive modulation waves is obtained by detecting the new modulation wave based on the phase of the previous modulation wave preceding by one symbol, and is then coded in accordance with the data of FIG. 17(b).

FIG. 18 is a block diagram showing one example of conventional digital demodulator for demodulating the π/4 shift QPSK modulation wave utilizing the delay detection method.

As shown in the same drawing, the phase modulation wave is converted into a base band signal consisting of I and Q channels respectively corresponding to a first signal having the same frequency as that of the carrier wave $\omega_c$ and a second signal shifted by π/2 from the first signal. Then, these I and Q signals are digitized by analog/digital converter (A/D) 7, 8 through low-pass filters 5, 6, respectively.

Thereafter, the digitized signals I and Q are decoded into X, Y based on the relation of FIG. 17(b) after detecting the difference of the signal-point arrangement to the signal preceding by one symbol, that is, the phase difference ΔΦ through delay detection circuit 9.

From the delay detection circuit 9, the resultant detection signals are sent to data discrimination portions 11, 12 and clock recovery circuit 13, respectively. The clock recovery circuit 13 determines a timing point as will be described below, and supplies a timing clock signal based on that timing point to the data discrimination portions 11, 12 for each one symbol cycle. The data discrimination portions 11, 12 fix the fundamental data (X, Y) using the detection signal based on the timing clock signal. Thereafter, the fundamental data (X, Y) is demodulated by parallel/serial converter 14 into a row of binary data as before the modulation process.

FIG. 19 shows an eye pattern obtained by overlapping the detection signals derived from the X output terminal of the delay detection circuit 9. Generally, the signal level at point (timing point) 10 on which the eye for fixing the binary signal (X=1 or 0) opens most widely is discriminated as the demodulation data for each symbol.

The most important in the above demodulation process is how to determine the timing point. Namely, the conventional clock recovery circuit determines the timing point to produce a timing clock signal. In that case, the so-called zero-cross detection method is generally known as a method of obtaining such a timing point. According to this method, the detection signal is taken out from one output terminal of the delay detection circuit 9 to detect the zero-cross point, at which the signal level crosses 0 (substantially the middle point between the two binary levels), designated by reference numeral 15 in FIG. 19. Then, the points 10 respectively shifted by ½ symbol cycle from the zero-cross point 15 are obtained and sent to the data discrimination portion 11, 12 as the timing point signal.

However, in case of such a clock recovery circuit for detecting the timing point using the zero-cross point as mentioned above, the point crossing 0 is distributed in a relatively wide range as denoted by At in the eye pattern of FIG. 19. Therefore, it is difficult to accurately fix the zero-point. If the timing point is determined as the point shifted by ½ symbol from that inaccurate zero-cross point, the points at which the eye would be considered to open most widely shift from the most desired points, thereby causing increase of bit error occurrence. Therefore, in a general way, a plurality of zero-cross points must be read to fix their middle value as the real or accurate zero-cross point. However, such a method of fixing the zero-cross point takes much time.

Such inconvenience of this method becomes more noticeable in such a digitized system for radio communication which will be put into practice soon because this system requires frequent change of communication channels and fixing of the aforementioned timing point for each change of channels.

Japanese Patent Application for Disclosure HEI-3-205940 teaches a method in which such digital radio communication is considered first. Namely, in this method, the signal points I, Q of the base band signal to be obtained by a quasi-synchronous detection of the preceding modulation wave are determined respectively on the I-Q coordinate plane. If these signal points deviate from a predetermined signal point arrangement, synchronous correction is carried out by shifting each phase by changing the delay time of the detection circuit so as to correct these positions into originally estimated positions. For example, if the detected signal point is located at a position designated by X in FIG. 20, the shift length is determined by estimating that the point X should be point P which is the nearest to the point X of those shown in FIG. 20.

However, in such a method, the possibility of wrong correction becomes considerably high for each one symbol detection if the deviation of the detected signal points from the predetermined point arrangement is too large to make the estimation unreasonable. Therefore, it takes much time to complete such synchronous correction.

FIG. 21 is a block diagram in which AFC circuit 27 is added to the digital demodulator for demodulating the π/4 shift QPSK modulation wave as shown in FIG. 18. In that device, an intermediate frequency signal is produced by mixing the modulation wave with a reference frequency, and is then input into phase quantization circuit 22 through band-pass filter 20 and limiter 21. Thereafter, the quantized signal from the quantization circuit 22 is used to obtain phase difference based on the signal preceding by one symbol using delay detection circuit 23 having a delay time corresponding to one symbol cycle.

The so-obtained phase difference signal is decoded into digital signals X, Y by decoding circuit 24, and these signals X, Y are then fixed based on a timing clock signal from clock recovery circuit 25. Thus, a demodulation signal is obtained by converting these fixed signals into a series of data by parallel/serial converter 26.

In case of the π/4 shift QPSK modulation wave, the resultant phase point after the delay detection should be one of the four circles as shown in FIG. 22(a). However, when frequency drift occurs, the phase point takes either one of positions as designated by X in FIG. 22(b). Thus, the phase shift between the positions of FIGS. 22(a) and 22(b) corresponds to the magnitude of frequency drift for one symbol.

Accordingly, the AFC circuit 27 is generally added to correct such frequency drift in the modulation wave. The degree of phase shift is estimated by counting the output of delay detection circuit 23 using up-down counter 28. Then, the count value is subjected to digital/analog conversion through filter 29. Thereafter, the frequency of VCXO 30 for generating the aforementioned reference frequency is so changed that the position of the phase point can coincide with either one of the circles as shown in FIG. 22.

However, even in such an improved system, it is also possible that the phase point which should correctly take the position of circle A emerges at the position X near the wrong position B as shown in FIG. 23 due to considerably large frequency drift. As a result, the AFC circuit 27 carries out wrong correction judging that the position B is the aimed phase point. Therefore, the possibility of obtaining wrong demodulation data still remains high.

Further, in case of mobile communication, base stations are generally placed in fixed areas respectively, and each mobile station performs communication through these base stations. For example, as shown in FIG. 24, mobile station 35 selects one station in the best circuit state to perform communication from base stations A, B and C located near the mobile station.

In this case, as the means for judging whether or not the communication circuit is in a good state, there is a method of comparing the electric field strength of the wave to be transmitted from each base station or a method of measuring the bit error rate (BER) capable of detecting the circuit state including noises or the like factors as well as the synchronous state of the demodulator. Generally, either one or combination of these two methods is used for that purpose.

As a generally-known method of measuring the bit error rate, there can be mentioned a method as shown in FIG. 25(a) in which a series of data (N bits) for measuring a specific bit error rate are inserted in advance at a predetermined interval in a series of information data formed by digitizing information, such as voice or the like elements, on the transmission side, and the bit error rate (n/N) is calculated by detecting the number of bits (n) wrongly received from the series of data for measuring the bit error rate when the demodulation is performed on the reception side. It is also possible to use a method as shown in FIG. 25(b) in which a parity bit is inserted in each group consisting of a plurality of bits (8 bits in the drawing) as a series of information data so as to estimate the bit error rate by the parity check on the reception side.

However, in such a method of measuring the bit error rate, the series of data or parity bit for measuring the bit error rate must be inserted in the series of information data, thereby degrading the communication efficiency. In the former method, in particular, transmission of a series of information data must be discontinued during transmission of the series of data for measuring the bit error rate.

The present invention was made to solve the problems in the clock recovery circuit, AFC circuit and bit error rate estimation means used in the aforementioned conventional digital demodulator and demodulation circuit.

The first object of the present invention is to provide a clock recovery circuit capable of producing desired demodulation signals and a digital demodulator including the clock recovery circuit.

The second object of the present invention is to provide a bit error rate estimation means which does not require any insertion of a specific series of data other than information data on the transmission side and can suppress the degradation of transmission efficiency to a minimum.

The third object of the present invention is to provide an AFC circuit capable of performing well-directed and suitable correction even in case of considerably large frequency drift.

SUMMARY OF THE INVENTION

To achieve the first object, the present invention provides a clock recovery circuit of the digital demodulator for detecting a modulation wave by predetermined detection means, comprising correlation detection means for sampling a signal in the demodulation process for each unit data cycle (symbol cycle) at a plurality of sampling points fixed in advance and detecting correlations between two adjacent sampling points; and correlation judgement means for comparing the correlations detected by the correlation detection means and deciding a pair of sampling points providing the largest correlation and producing a timing clock signal based on the judgement of the pair of sampling points providing the largest correlation.

Alternatively, the clock recovery circuit to achieve the first object may comprise correlation detection means for sampling a signal in the demodulation process for each unit data cycle (symbol cycle) at a plurality of sampling points fixed in advance and detecting correlations between two adjacent sampling points; correlation judgement means for comparing the correlations detected by the correlation detection means, deciding a pair of sampling points providing the largest correlation and another pair of sampling points providing the next largest correlation and producing a timing clock signal based on the judgement; and phase shift means for shifting the phase of the digital signal so as to equalize the correlations of the two pairs of sampling points.

To achieve the second object, the present invention provides a bit error estimation means of the digital demodulator for demodulating a modulation wave detected by predetermined detection means, which samples a signal in the demodulation process for each unit data cycle (symbol cycle) at a plurality of sampling points fixed in advance and detects correlations between two adjacent sampling points so as to estimate the bit error rate based on the distribution of the detected correlations.

To achieve the third object, the present invention provides an AFC circuit of the digital demodulator for demodulating a modulation wave detected by predetermined detection means, comprising a bit error rate estimation means for sampling a signal in the demodulation process for each unit data cycle (symbol cycle) at a plurality of sampling points fixed in advance and detecting correlations between two adjacent sampling points so as to estimate the bit error rate based on the distribution of the detected correlations; a bit error rate measuring device for measuring each bit error rate based on a series of bit error rate measuring data inserted in the modulation wave at a predetermined interval, thereby correcting the frequency drift of the modulation wave by comparing the two bit error rates.

BRIEF DESCRIPTION OF THE DRAWINGS

FIG. 16 is a block diagram showing a standard construction of the π/4 shift QPSK modulator.

FIGS. 17(a) and 17(b) show a π/4 shift QPSK demodulation method, respectively.

DETAILED DESCRIPTION OF THE PRESENT INVENTION

Hereinafter, several embodiments related to this invention will be described in detail with reference to the drawings.

Figure 19:
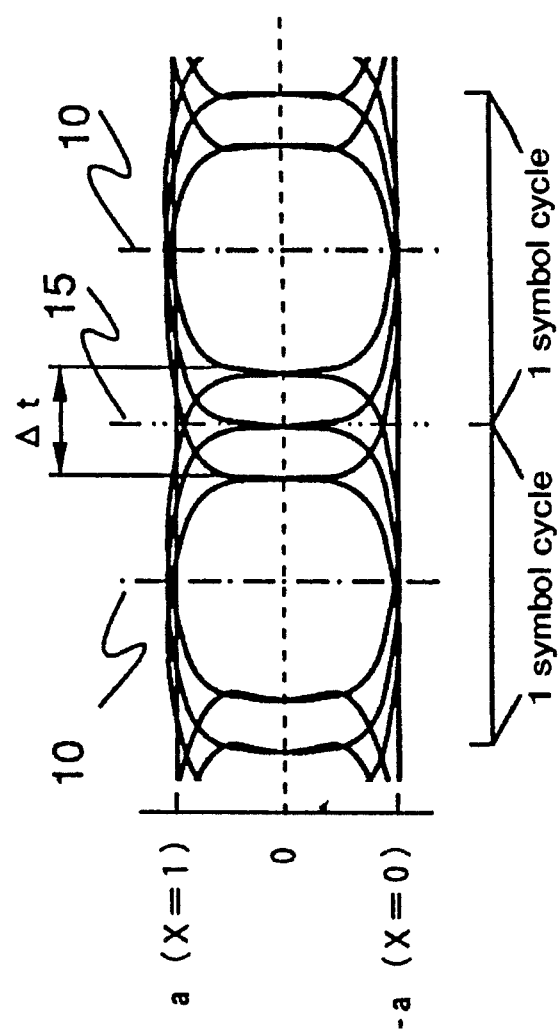
FIG. 19 is an eye pattern of a detection signal.

As is seen by the eye pattern in FIG. 19, at timing point 10 on which the eye opens most widely, the level of detection data becomes a or −a (X=1 or 0) at which it is focused With a relatively high density, and is kept at substantially the same level in the vicinity of point 10. Contrary, in the vicinity of point 15 or location farther from the timing point 10, the probability of discordance in that level becomes high.

Namely, by fixing a plurality of sampling points with respect to a detection signal for one symbol cycle and by making a detection whether the data value is 1 or 0 at each sampling point so as to determine the correlation between the data at each adjacent pair of the sampling points, the correlation becomes large in the vicinity of the timing point where the data are substantially the same, while becomes small in the area where those data of two sampling points are distinctly different. In other words, the correlation is relatively large at point 10 in FIG. 19, while small at point 15.

One important aspect of this invention is to obtain a desired demodulation signal based on such comparison between the correlation values for detecting the timing point.

Figure 26:
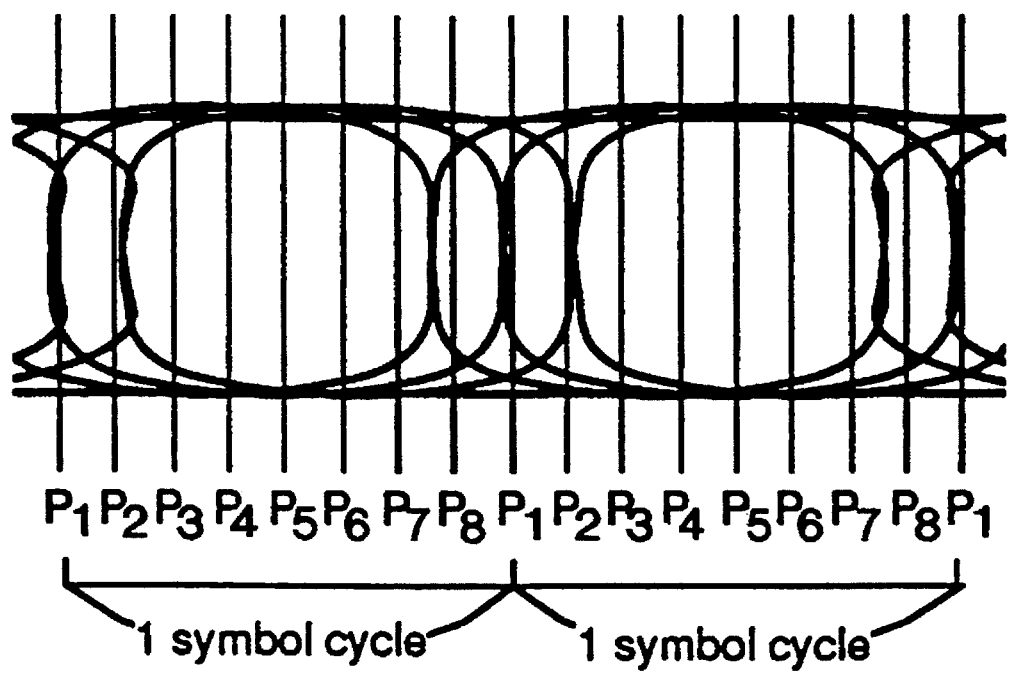
FIG. 26 shows an example of fixing the sampling points.

Specifically, as shown in FIG. 26, a pair of sampling points (to be estimated in this case as P4 and P5 or P5 and P6) are obtained to fix the timing point as either one of them, by sampling signal levels at predetermined sampling points (8 points for one symbol) for each one symbol cycle, detecting and comparing the correlations on those sampling data between each adjacent pair of P1 and P2, P2 and P3, . . . , respectively, then determining the pair of sampling points to make the correlation the largest.

Figure 1:
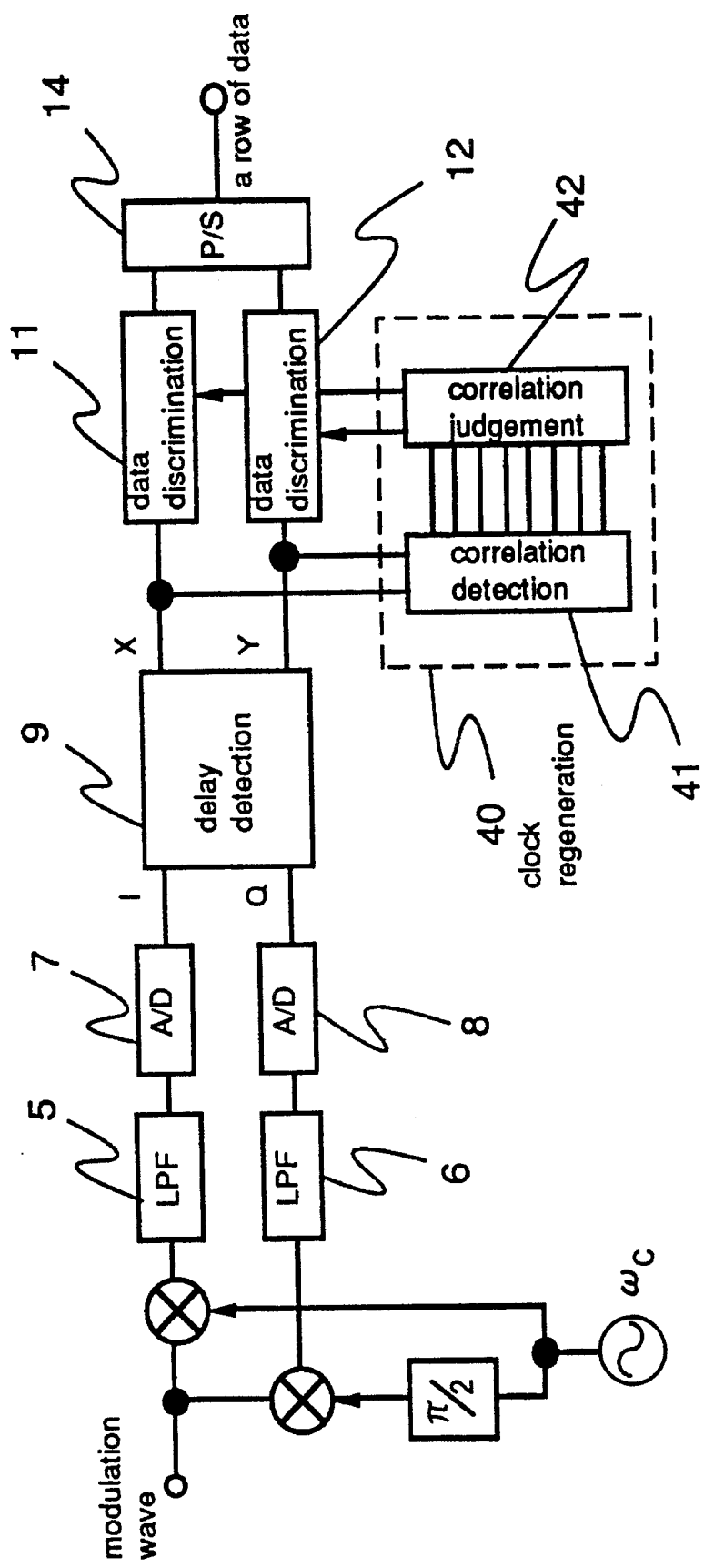
FIG. 1 is a block diagram showing one example of the construction in which an embodiment of the clock recovery circuit of this invention is applied to a digital demodulator.
Figure 18:
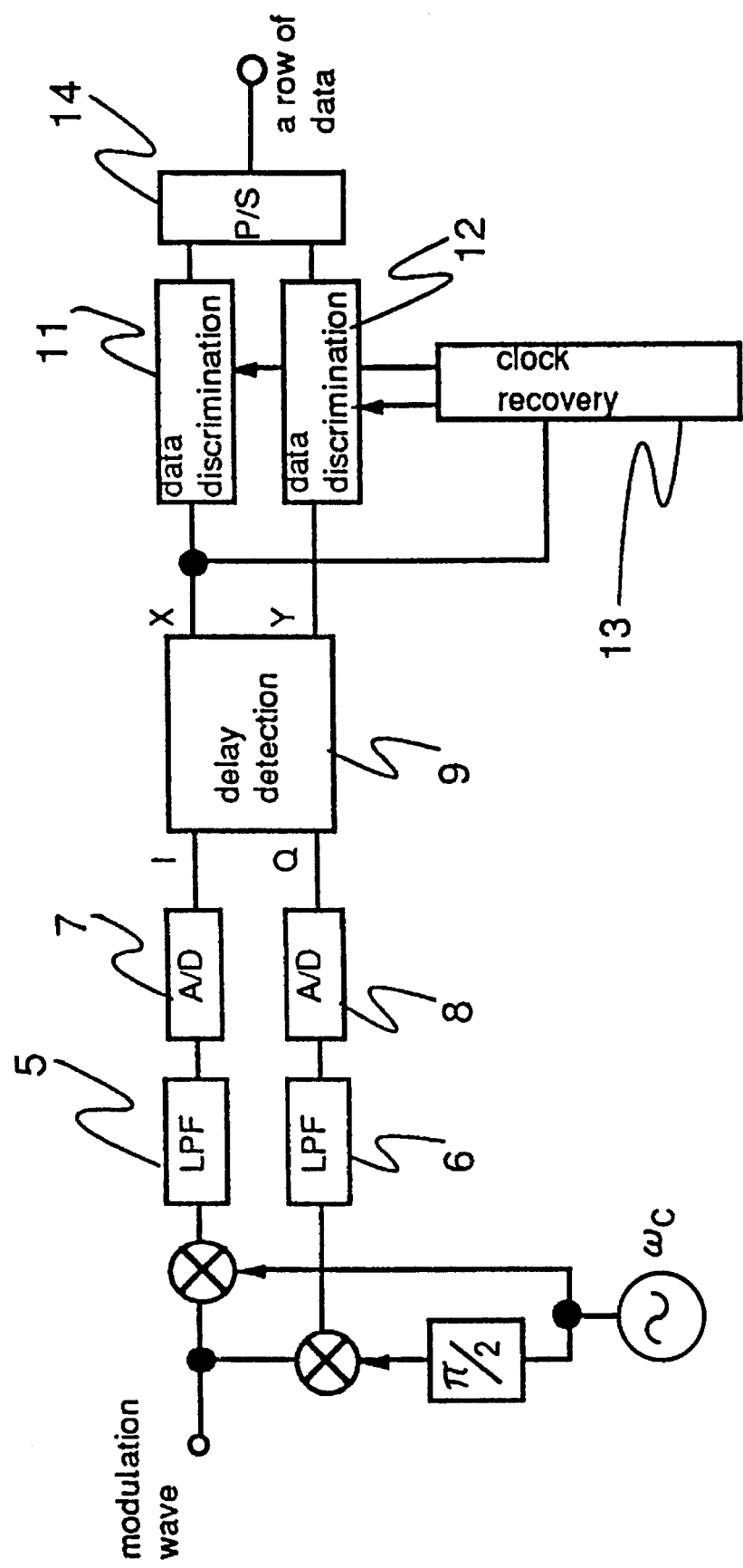
FIG. 18 is a block diagram showing a standard construction of the conventional demodulator.
Figure 20:
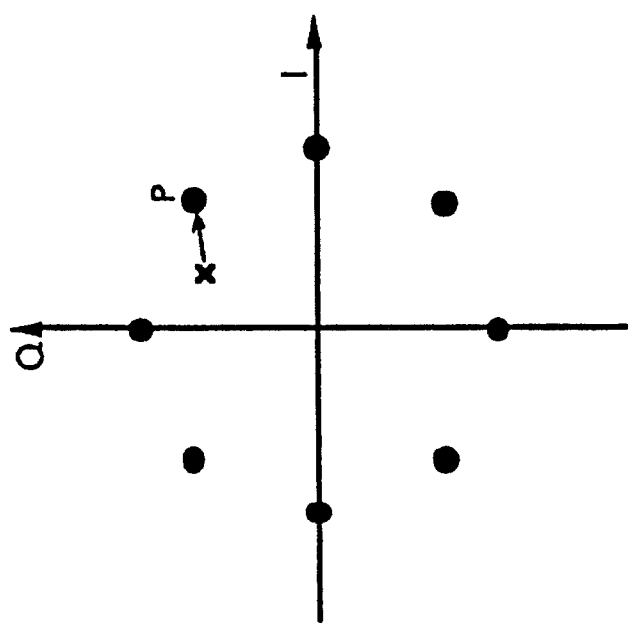
FIG. 20 shows conventional phase shift estimation means.

FIG. 1 is a block diagram showing construction in which one embodiment of a clock recovery circuit related to this invention is applied to a digital demodulator. In FIG. 1, like reference numerals denote like portions in FIG. 18, respectively.

Clock recovery circuit 40 according to this invention comprises correlation detection circuit 41 and correlation judgement circuit 42. The correlation detection circuit 41 samples respective levels of detection signals X, Y from delay detection circuit 9 at a plurality of sampling points fixed in advance for each one symbol cycle. Further, the circuit 41 detects correlation between signals sampled respectively at each adjacent pair of the sampling points as a set, adds the detected correlations in sets of the sampling points with respect to X and Y, and then supplies the results to correlation judgement circuit 42 after accumulating them by a certain number of symbols.

Figure 2:
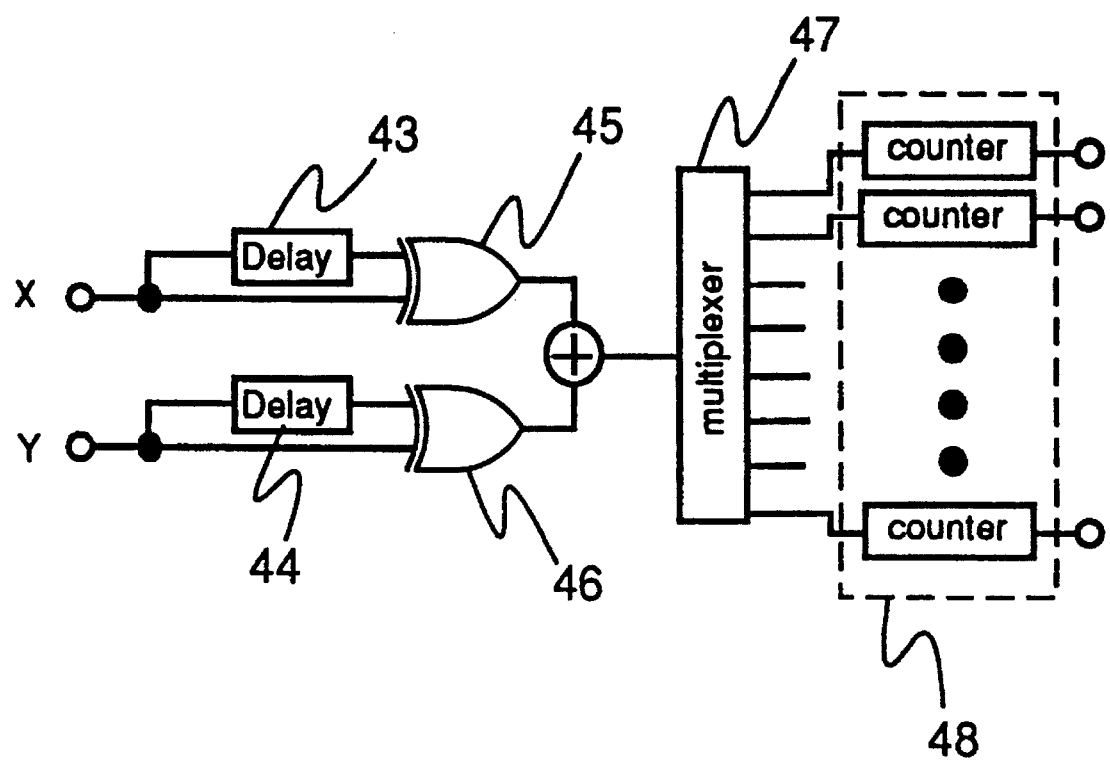
FIG. 2 is a block diagram showing one example of the construction of the correlation detection circuit.

FIG. 2 is a block diagram showing one example of construction of the correlation detection circuit 41. In the same drawing, delay circuits 43, 44 commonly have delay time τ which corresponds to the interval of the sampling points. Detection signals X, Y are input directly to each terminal of XOR (exclusive OR) gates 45, 46 and to the respective other terminals thereof through the delay circuits 43, 44 so as to detect the correlation to the sampling point located just before.

Thereafter, both the correlation data are added, and the result is then supplied to counter 48 after distributed at cycle τ by multiplexer 47. The counter 48 accumulates correlation data corresponding to a predetermined number of symbols.

The correlation judgement circuit 42 compares the accumulated correlation data to detect the pair of sampling point providing the largest correlation. Then, the circuit 42 judges one of the sampling points as timing point, and produces a timing clock signal based on the timing point.

Figure 3:
FIG. 3 shows input-output characteristics of an XOR gate.

As is well known, the XOR gates generally have input-output characteristics as shown in FIG. 3. Therefore, "0" is outputted when the correlation is relatively large (or the input levels are substantially identical), while "1" is outputted when small (or the input levels are not identical). Accordingly, the closer to 0 the numeral values accumulated in the counter become, the larger correlation the sampling point provides. Thus, the correlation judgement circuit 42 is constructed to obtain the minimum value of a plurality of input data derived from the previous stage.

Further, the detection signals X, Y outputted from delay detection circuit 9 are sent to data discrimination portions 11, 12, respectively. These data discrimination portions 11, 12 decode the detection signals X, Y based on the timing clock produced by the correlation judgement lo circuit 42. Thereafter, the decoded signals are demodulated into a series of data by parallel/serial converter 14.

Namely, by constructing the clock recovery circuit 40 as described above, it becomes possible to detect the distribution of correlation for each one symbol and fix a timing point based on that distribution.

In more detail, while the timing point has been estimated in the prior art based on such an instable point as zero-crossing point, the present invention can directly decide that point as a relatively stable timing point on which the eye pattern opens most widely. Therefore, such a decision of this invention is not subjected to a rapid phase shift due to fading or the like factors. It is also possible to fix a proper timing point in a short time even in case of a relatively large phase shift.

Figure 4:
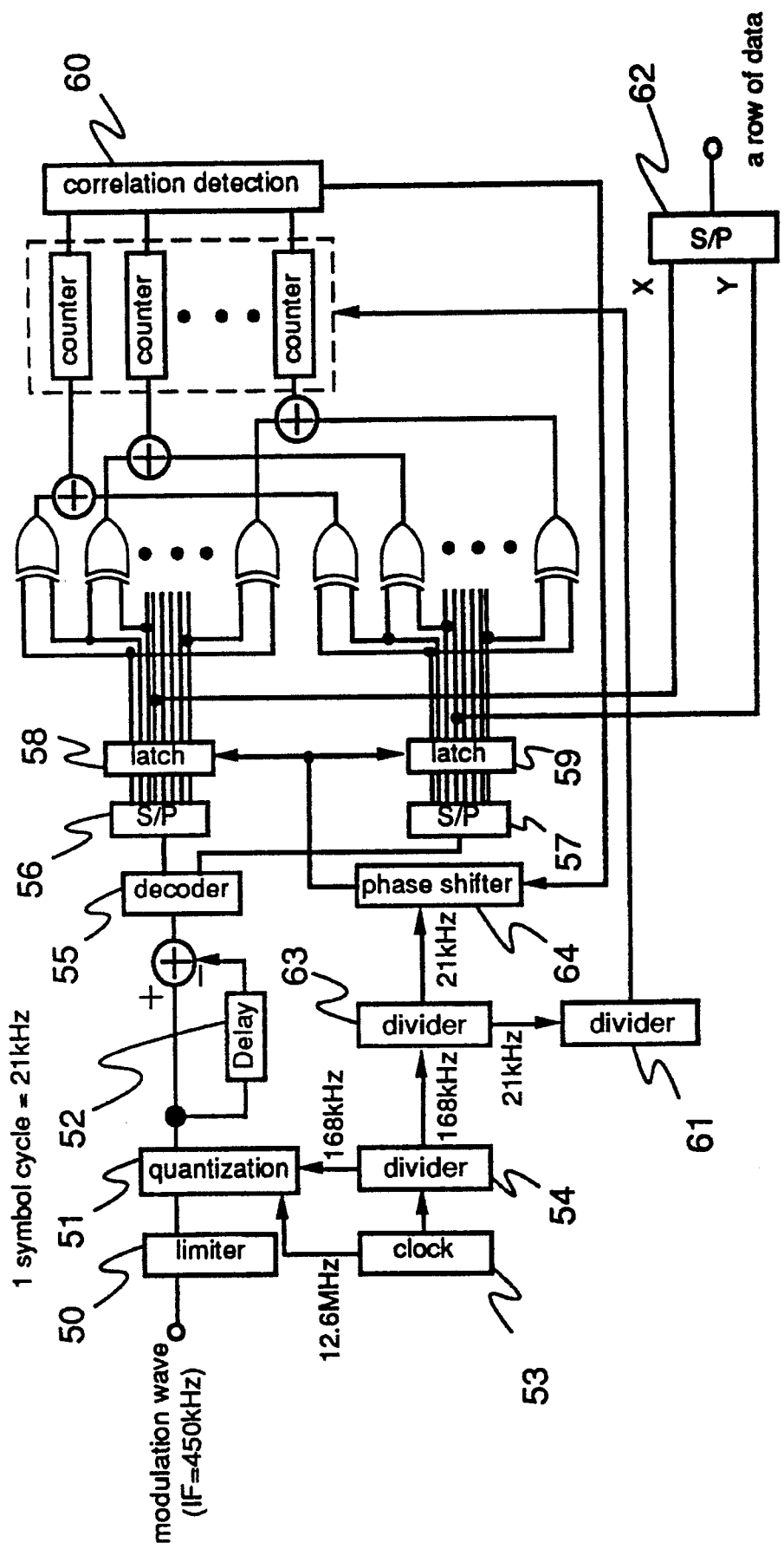
FIG. 4 is a block diagram showing a second embodiment of the digital demodulator according to the present invention.

FIG. 4 is a block diagram showing construction of a second embodiment of the digital demodulator related to this invention, which demodulates a phase modulation wave converted into an intermediate frequency (IF).

The amplitude of a phase demodulation wave is controlled by limiter circuit 50, and its phase is then quantized by phase quantization circuit 51.

Then, phase difference ΔΦ is obtained as a quantization signal based on the difference between the phase-quantized signal and the previous signal preceding by one symbol adjusted by delay circuit 52 having a delay time of one symbol cycle.

For example, if the IF frequency is 450 kHz and the one symbol cycle (frequency) is 21 kHz, and a 12.6 MHz pulse signal and another 168 kHz pulse signal produced from the 12.6 MHz signal by 1/75 division using divider 54 are inputted to phase quantization circuit 51 through clock 53 and divider 54 respectively, the phase modulation wave is divided into eight elements per one symbol by the pulse signal from divider 54, and each element is quantized corresponding to each phase by the pulse signal from clock 53.

In this case, the phase of each element is expressed by 0 to 27 signal pulses from the frequency ratio between IF and the pulse signal of clock 53 so that the phase difference ΔΦ is outputted also in the form quantized by those 0 to 27 signal pulses. Thus, the relation between the phase difference ΔΦ and the number of pulses can be expressed as shown in FIG. 5(*a*) in which a coordinate system is divided into 28 sections.

Figures 5A, 5B:
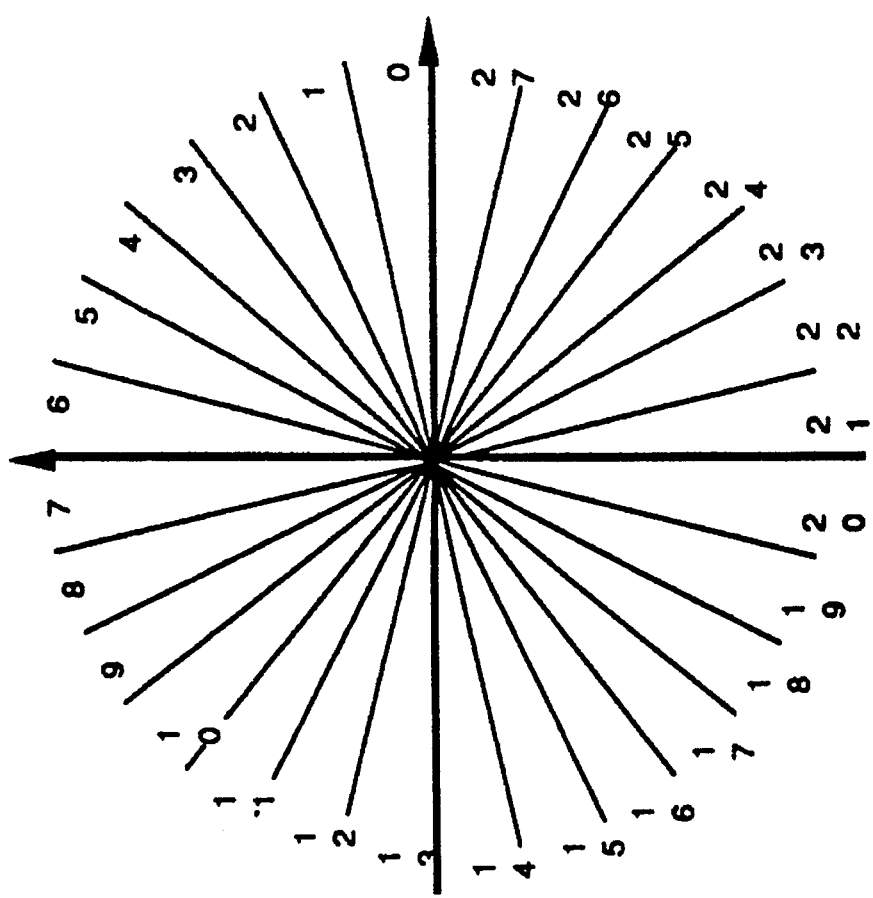
FIGS. 5(a) and 5(b) show the operation of a phase quantization circuit, respectively.

Namely, decoding circuit 55 determines a quadrant corresponding to each element inputted therein based on FIG. 5(*a*) by the number of pulses of the element, and decides the phase difference ΔΦ based on FIG. 5(*b*) so as to decode the element into digital signals X, Y in accordance with the relation shown in FIG. 17(*b*). Since each of the digital signals X, Y is composed of a series of eight data per one symbol cycle, it is parallelized by serial/parallel converter 56, 57 and then latched by latch circuit 58, 59 for each one symbol cycle.

Then, each adjacent pair of bits in the outputs from the respective latch circuits 58, 59 are inputted as a set into each corresponding XOR gate to detect the correlation. Thereafter, the detected data are added in sets of the bits with respect to X and Y and then accumulated in counters by a predetermined number of symbols. Then, correlation judgement circuit 60 which received the data of counters judges the set minimizing the data or the points maximizing the correlation, and produces a timing clock signal based on those points.

Phase shifter 64 shifts the timing of latching data in latch circuits 58, 59 based on the timing clock signal so that the pair of sampling points judged by the correlation judgement circuit 60 correspond to the fourth and fifth counters.

In that way, the signals drawn out from the fifth bits of output terminals in the respective latch circuits 58, 59 become signals X, Y at the timing point, respectively. Then, they are demodulated into a series of data by parallel/serial converter 62.

In FIG. 4, reference numeral 63 denotes a divider for supplying one symbol cycle as the latch timing. Divider 61 further divides that symbol cycle to supply the number of count symbols for counters.

Figure 6:
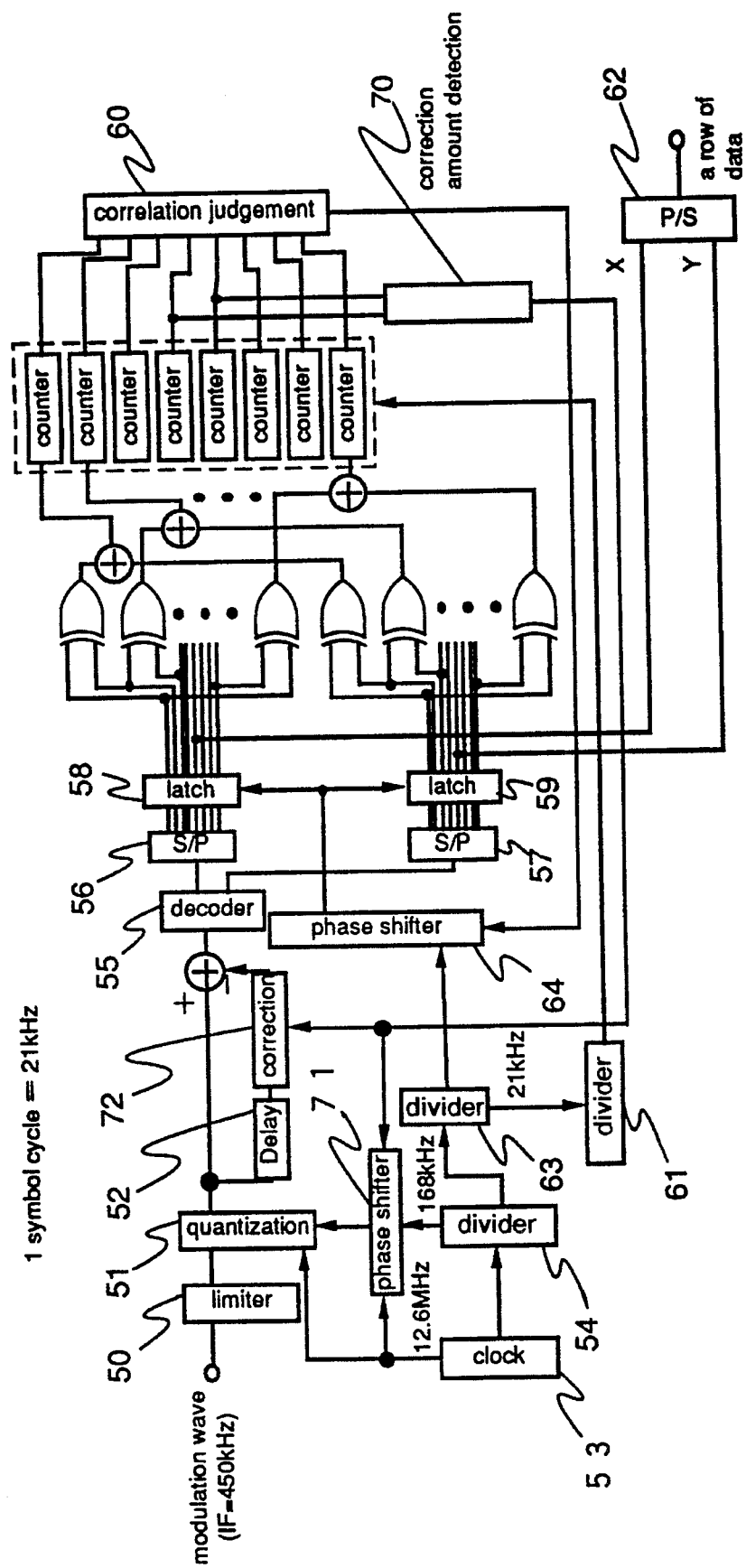
FIG. 6 is a block diagram showing another embodiment of the digital demodulator device according to the present invention.

FIG. 6 shows a modified example of the embodiment shown in FIG. 4. In this case, the outputs of the fourth and fifth counters are sent to correction amount detection portion 70, and phase shifter 71 and correction delay circuit 72 shift the phase of a signal in the demodulation process based on that detection portion 70 so as to equalize the output values of both the counters.

This method of sampling such decoded digital signals in a predetermined manner and then detecting correlations between data adjacent one another is highly effective in case of obtaining a timing point or the like case. Since this method directly determines that point as a point at which the eye pattern opens most widely, it is not likely to be affected by noise near the zero-crossing point. In addition, since the timing point is renewed every time the modulation wave is demodulated by a plurality of symbols, this inventive system can rapidly follow the phase shift to be caused by fading.

Next, the bit error rate estimation means for use in the demodulator related to this invention will be described.

Figure 7:
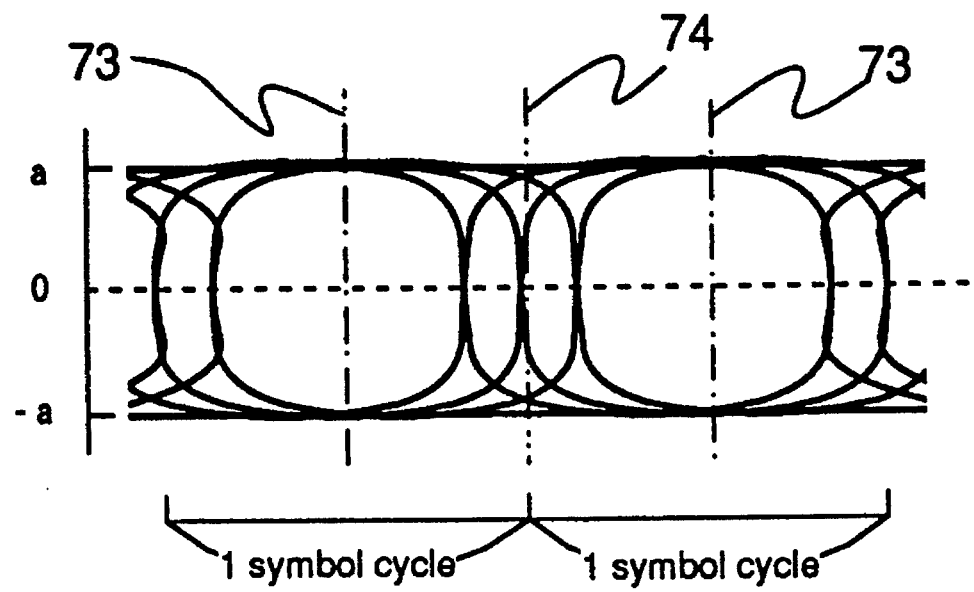
FIG. 7 is an eye pattern of a detection signal in the demodulation process.

FIG. 7 schematically shows an eye pattern to be obtained by overlapping several times the detection signals in the demodulation process of the digital demodulator. In the same drawing, the signal level at point (timing point) 73 at which the eye pattern opens most widely is discriminated as the demodulation data for each symbol.

Figure 8:
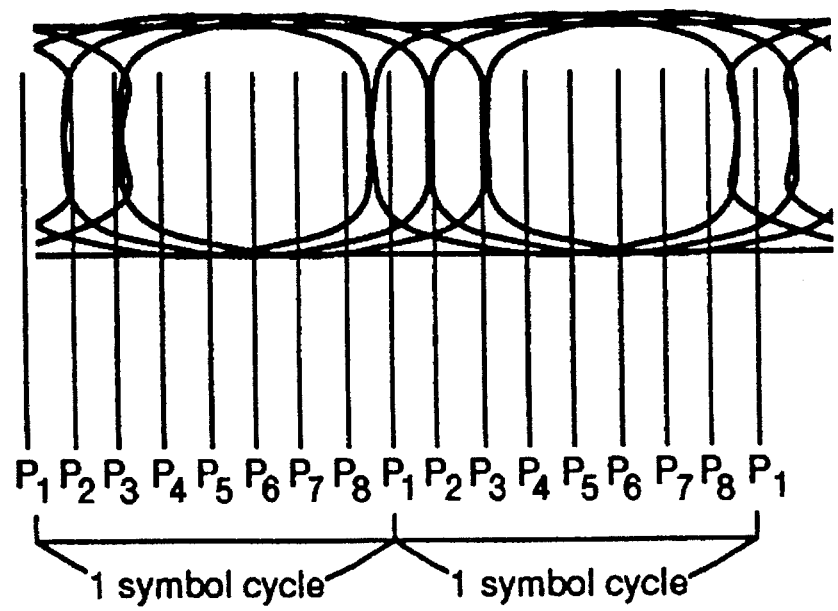
FIG. 8 shows one example of fixing the sampling points.
Figure 9A:
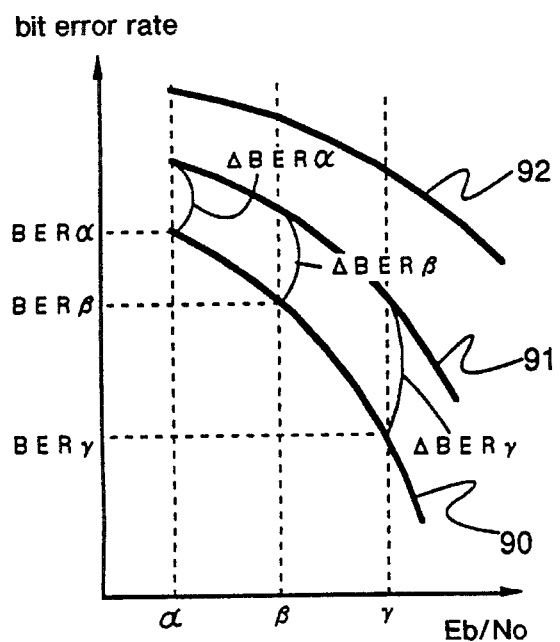
FIGS. 9(a) and 9(b) show the relation between the bit error rate and $E_b/N_o$ and between that rate and sampling points, respectively.

Generally, the bit error rate is evaluated by measuring it in a synchronous state or at a timing point. FIG. 9(a) shows a result of measuring the bit error rate in the event that a predetermined number of sampling points (eight points per one symbol) are fixed for each one symbol cycle as shown in FIG. 8, and demodulation is performed for each sampling point. In FIG. 9(a), the horizontal axis shows the ratio between density No of noise power spectrum and signal energy Eb per one bit, and the vertical axis shows the logarithm of the bit error rate.

In the same drawing, reference numeral 90 is a curve obtained at timing point P5, 91 at P4 or P6, and 92 at P3 or P7. It should be understood that the bit error rate will rise with the sampling point getting away from the timing point, while fall with decrease of noise (or increase of $E_b/N_o$).

If the difference of bit error rate $\Delta$BER at each of three points $\alpha$, $\beta$ and $\gamma$ is measured with respect to curves 90 and 91 in FIG. 9(a), the relation of $\Delta BER_\alpha > \Delta BER_\beta > \Delta BER_\gamma$ will be obtained. Though there can not be seen definite difference between these $\Delta$BERs in the drawing, there is, in fact, a relatively large difference between these error rate values because they are expressed respectively as logarithms in the same drawing.

Figure 9B:
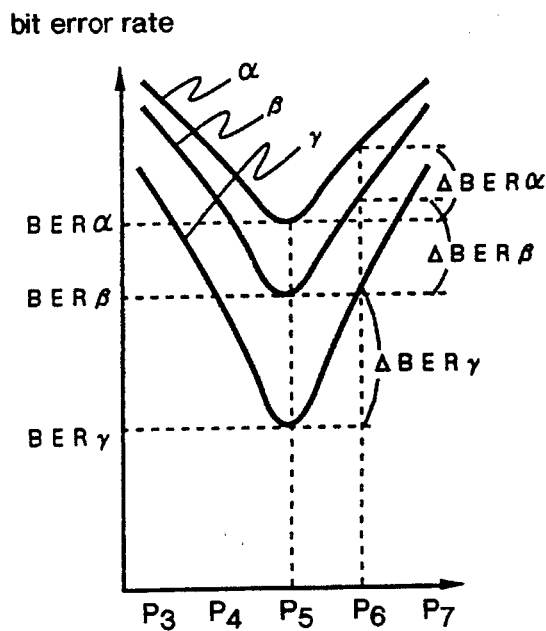

As is also apparently seen from FIG. 9(b) showing the relation between each sampling point and the bit error rate with respect to $\Delta BER_\alpha, \Delta BER_\beta$ and $\Delta BER_\gamma$ correspond well to the bit error rates $BER_\alpha$, $BER_\beta$ and $BER_\gamma$ at the timing point, respectively. Therefore, by measuring $\Delta$BERs, it becomes possible to obtain the bit error rate at the timing point.

On the other hand, in case of the timing point 73 shown in FIG. 7 at which the eye pattern opens most widely, the level of detection signal becomes a or −a where it converges at a relatively high density, and is kept at substantially the same level near that point 73. However, the probability of discordance in the level of detection signals becomes high in the area far from the timing point 73 and near the zero-crossing point 74.

Figure 10:
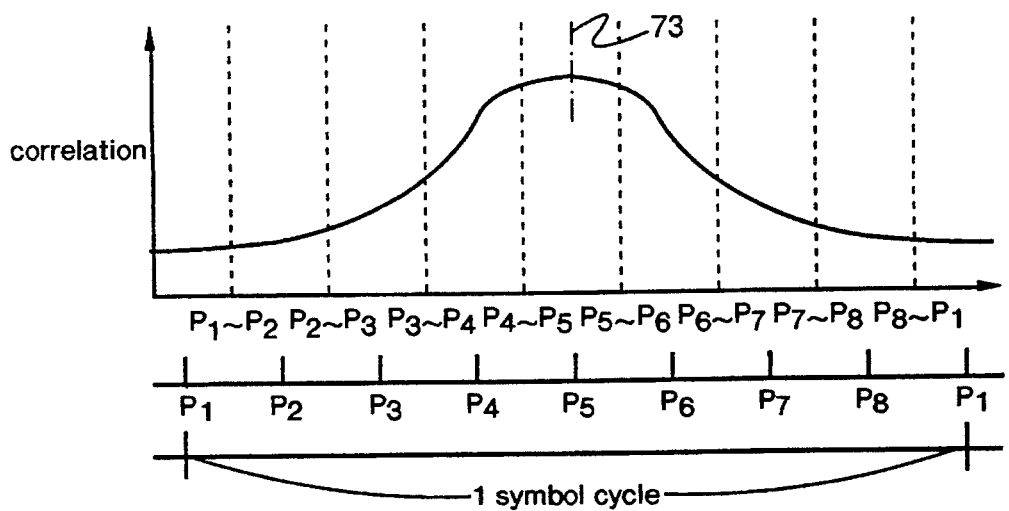
FIG. 10 shows distribution of correlation values over the respective sampling points.

When the correlation between each adjacent pair of the sampling points as fixed in FIG. 8 is examined, there can be obtained a curve as shown in FIG. 10 very similar to the curve of FIG. 9(b), showing the fact that the correlation value becomes large near the timing point 73 (P5) where the signal level is kept substantially the same, while becomes small when the signal levels of two sampling points are distinctly different.

Accordingly, considering the fact that both the correlation and the bit error rate show a similar distribution to the sampling points, the present invention is constructed to fix the predetermined number of sampling points for a certain signal in the demodulation process and estimate the bit error rate at the timing point by detecting the correlation.

Specifically, the signal levels at the sampling points as fixed in FIG. 7 are sampled, and the correlation of the sampled data between each adjacent pair of sampling points P1 and P2, P2 and P3, . . . , are detected successively, then the pair of sampling points which maximize the correlation and another pair adjacent that pair showing the larger correlation (P4 and P5, and P5 and P6 in FIG. 8) are determined. Further, synchronization is performed to make those pairs of sampling points take the same value. Then, the sampling point (P5 in the same drawing) belonging to both the pairs is fixed as the timing point.

Since the correlation value of such a pair of sampling points in a synchronized state corresponds to the aforementioned $\Delta$BER, the bit error rate can be estimated using the correlation value by a calculation based on statistic values giving the relation between correlation values and $\Delta$BERs obtained in advance by measurement and the relation between $\Delta$BERs and the bit error rate at the timing point.

Figure 11:
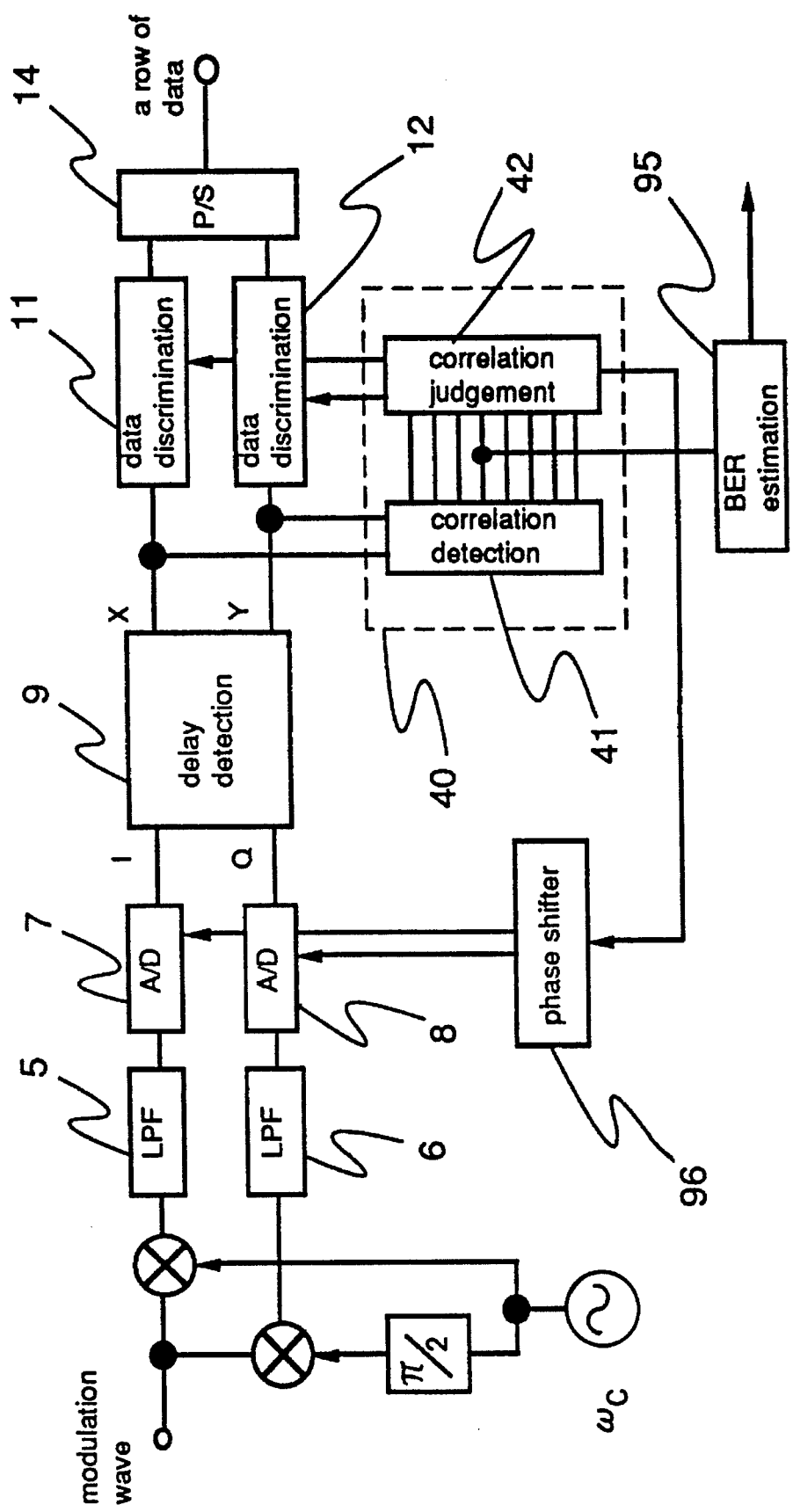
FIG. 11 is a block diagram showing construction in which one embodiment of the bit error rate estimation means related to this invention is applied to the digital demodulator.
Figure 12:
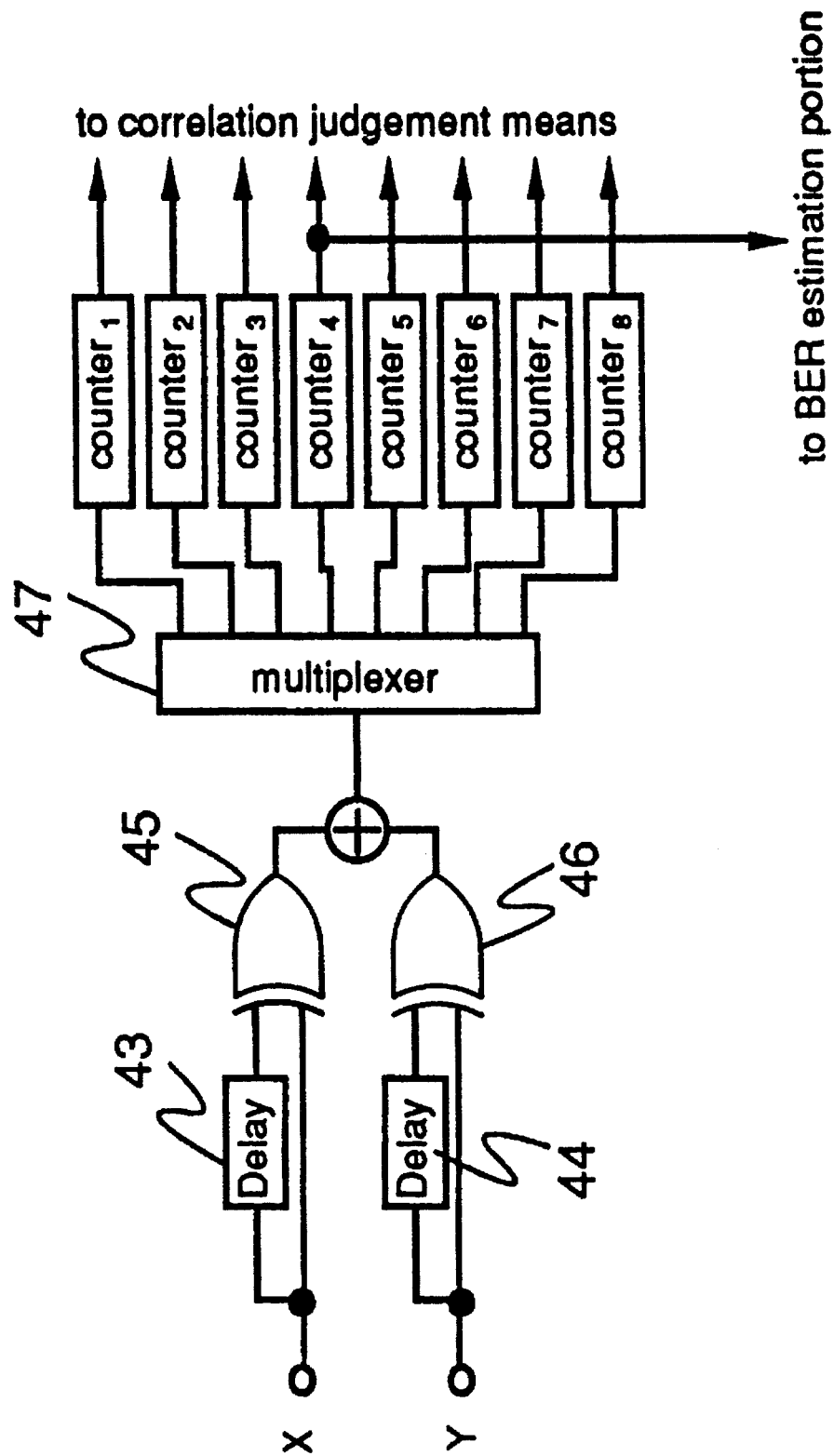
FIG. 12 is a block diagram showing one example of construction of the correlation detection circuit.

FIGS. 11 and 12 respectively show construction in which the bit error rate estimation means related to this invention is applied to a digital demodulator. In the same drawings, like parts in FIGS. 1 and 2 are designated by like reference numerals, respectively.

In the construction shown in FIGS. 11 and 12, counter 4 of correlation detection circuit 41 outputs data to bit error estimation circuit 95. Namely, when synchronized as shown in FIG. 10, sampling point P5 becomes the timing point, and the output of counter 4 expresses the correlation between sampling points P4 and P5. Since the output data corresponds to the aforementioned $\Delta$BER, the bit error rate at the timing point can be estimated by the bit error rate estimation means 95 through a predetermined calculation on that correlation value from the counter 4. Thus, based on that estimated bit error rate, the control system of the demodulator selects a radio wave the most suitable to the current circuit condition from a plurality of base stations.

In this case, as the bit error rate device 95, any means may be used if it can perform conversion based on statistic values for giving relations between a correlation value measured in advance and ΔBER and between ΔBER and the timing point. That is, a logic circuit may be constructed based on the aforementioned statistic values, or numerical operations by a microcomputer or the like means may be used.

Figure 13:
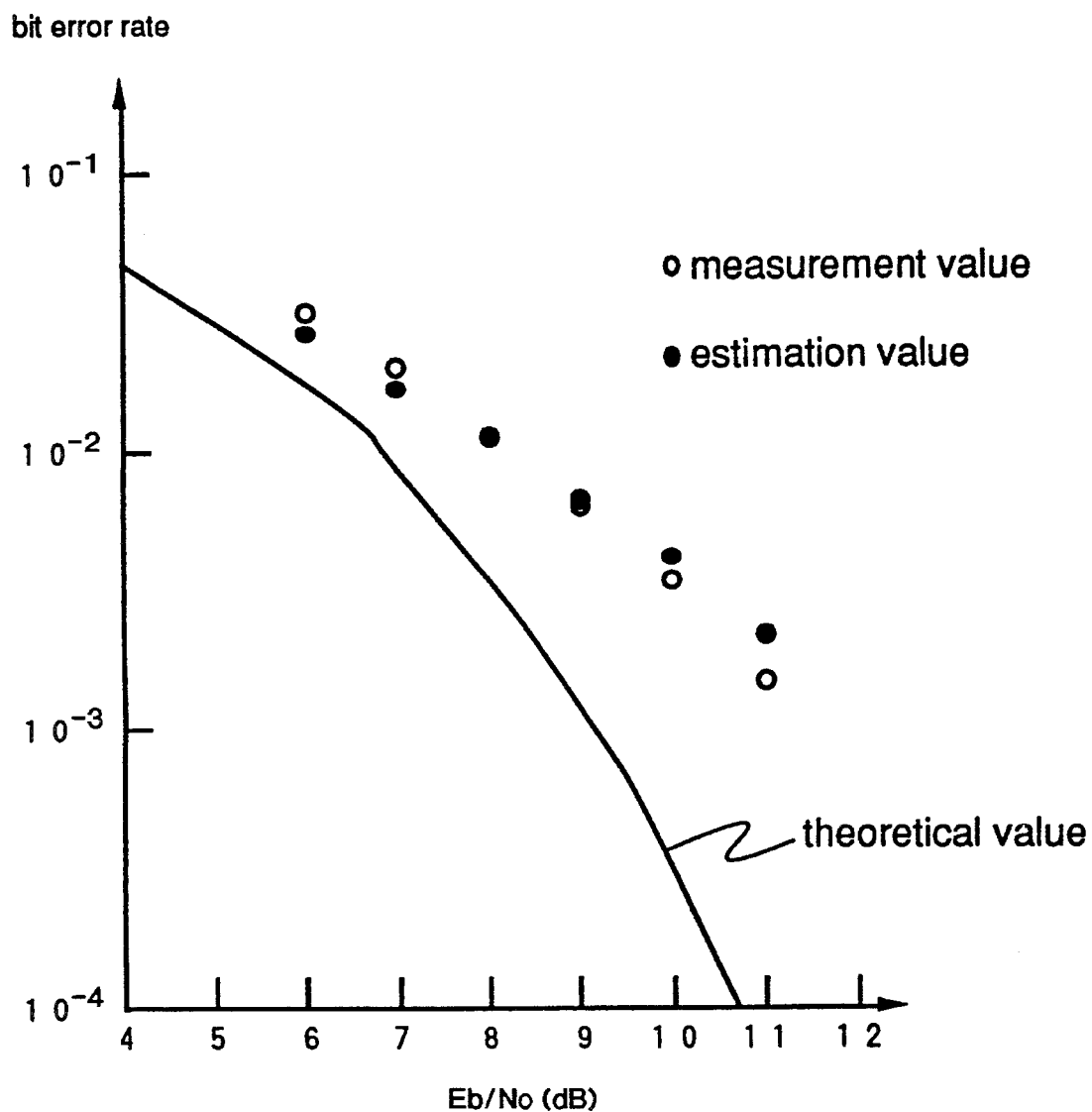
FIG. 13 is a graph showing results of simulation for the bit error rate measurement.

FIG. 13 is a graph showing results obtained from a simulation of bit error rate measurement. Marks expressed by circles (○) respectively show measurement results from a conventional method comprising adding a predetermined noise to a series of modulated data and then dividing the number of bit errors when demodulated by the demodulation circuit by the number of all the bits. The other marks expressed by blackened circles (●) respectively show the results obtained by using the bit error rate estimation means according to this invention under the same condition. As is clearly seen from the same drawing, the estimation is fully reliable in practical use because both the above results are substantially the same.

Next, the AFC circuit for use in the demodulator related to this invention will be described.

Figure 14:
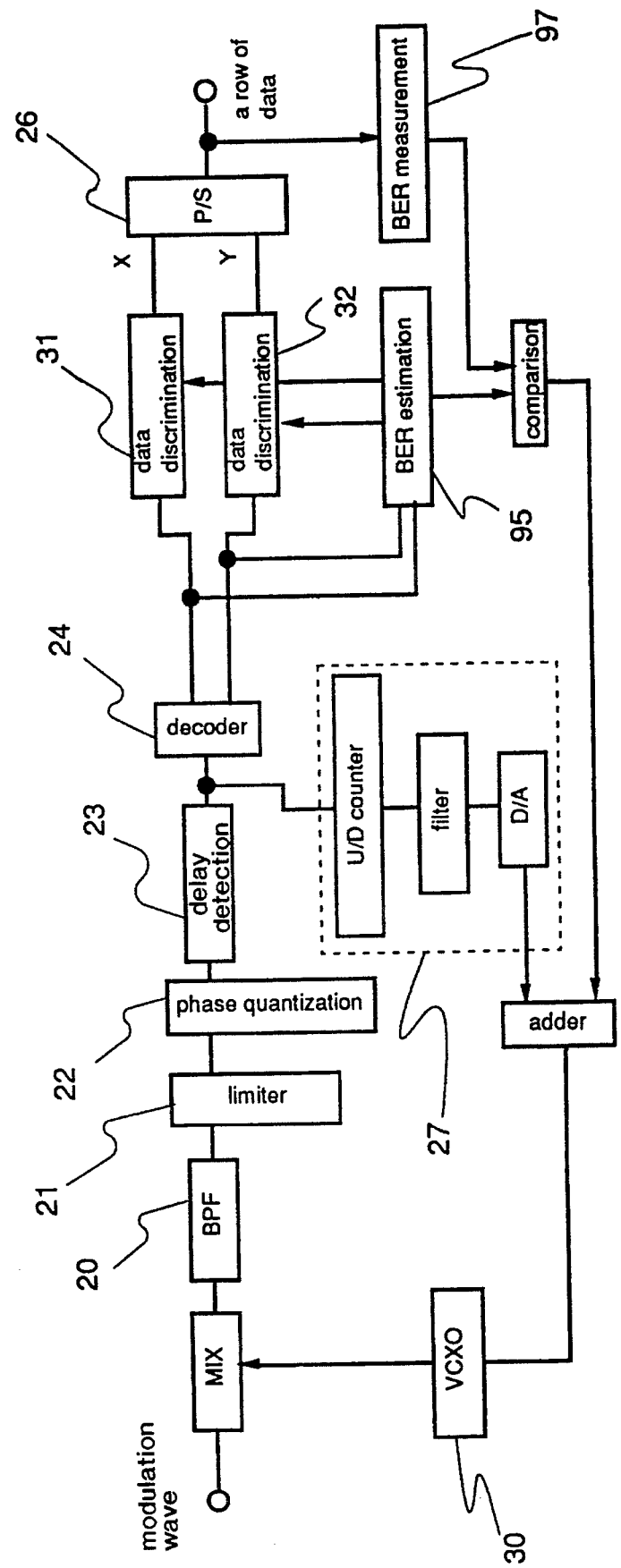
FIG. 14 is a block diagram showing construction in which one embodiment of the AFC circuit related to this invention is applied to the digital demodulator.
Figure 21:
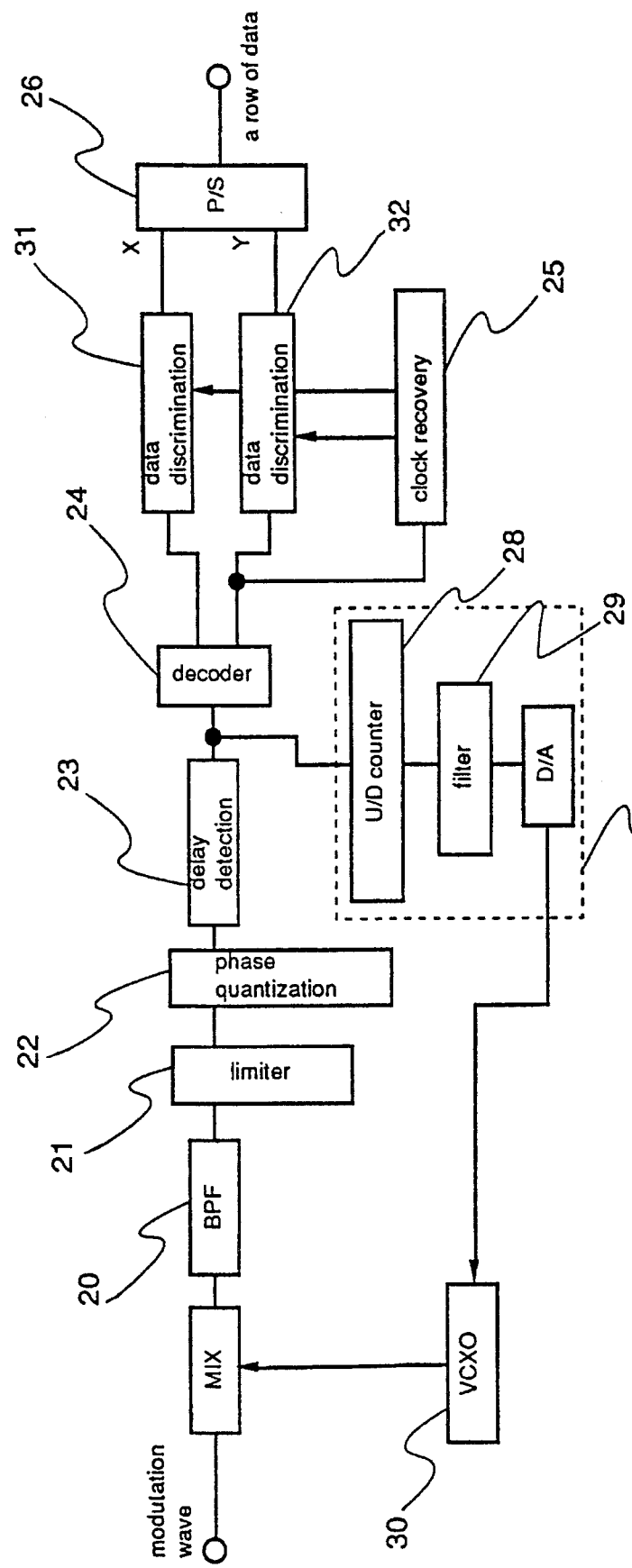
FIG. 21 is a block diagram showing a π/4 shift QPSK modulator.
Figure 22A:
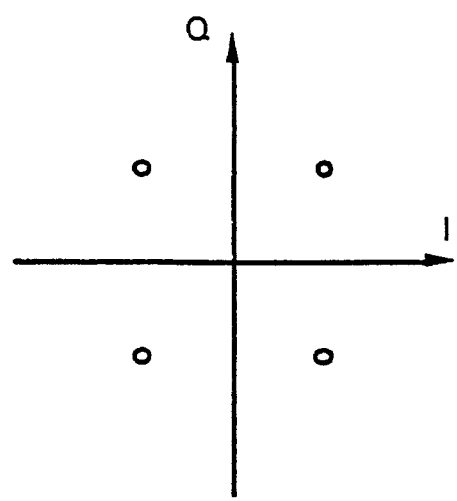
FIGS. 22(a) and 22(b) show a change of the phase point to be caused by frequency drift, respectively.
Figure 22B:
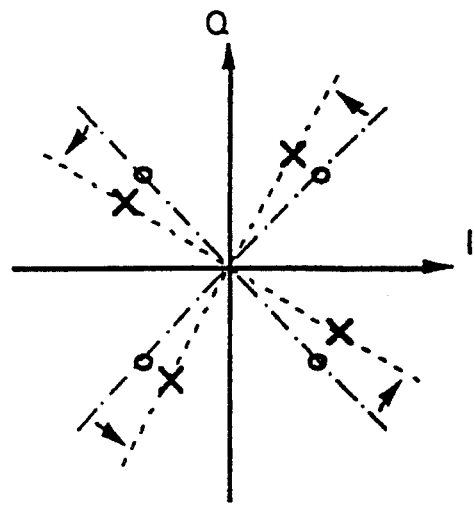
Figure 23:
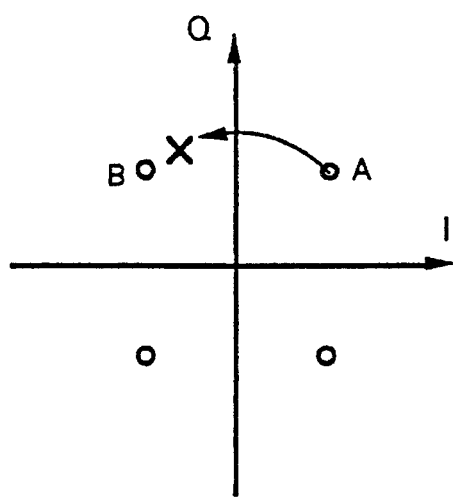
FIG. 23 shows a relatively large-scale change of the phase point caused by frequency drift.
Figure 24:
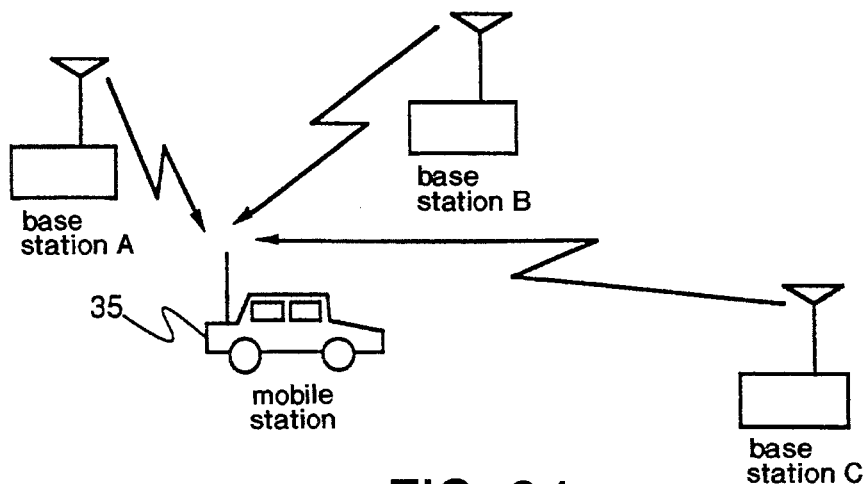
FIG. 24 schematically shows a mobile communication system.
Figure 25A:
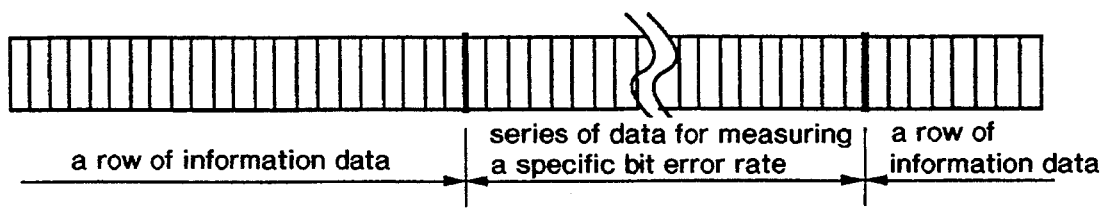
FIG. 25 shows a conventional method of measuring the bit error rate.
Figure 25B:
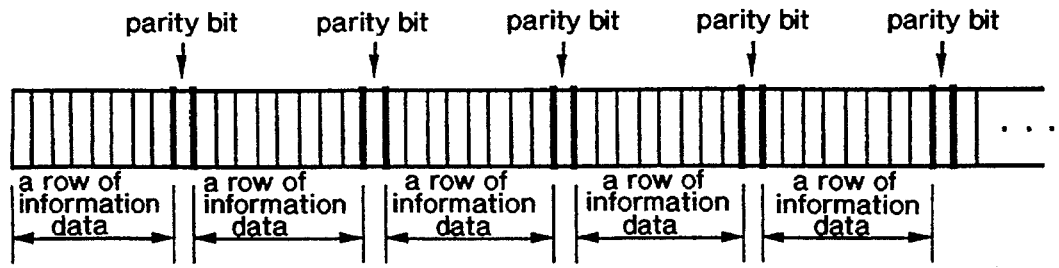

As described above, this circuit corrects frequency drift in a modulation wave based on comparison between an estimation value from the bit error rate estimation means and a value measured by a known bit error rate measuring device for measuring a bit error rate based on a series of data specifically used for the bit error rate measurement inserted in the modulation wave at a predetermined interval. FIG. 14 shows construction in which one embodiment of the AFC circuit related to this invention is applied to the digital demodulator. In the same drawing, like reference parts in FIG. 21 are designated by like reference numerals, respectively.

Phase quantization circuit 22 divides a signal into eight elements per one symbol and quantizes each element corresponding to each phase. Using delay detection circuit 8 having a delay time corresponding to one symbol cycle, phase difference for each element is obtained by detecting difference from the signal preceding by one symbol. Decoding circuit 9 produces decoded digital signals X, Y respectively based on the phase difference of each element.

Based on the decoded signals, the bit error rate estimation means 95 estimates a bit error rate and produces a timing clock signal to decide data of X, Y.

Figure 15:
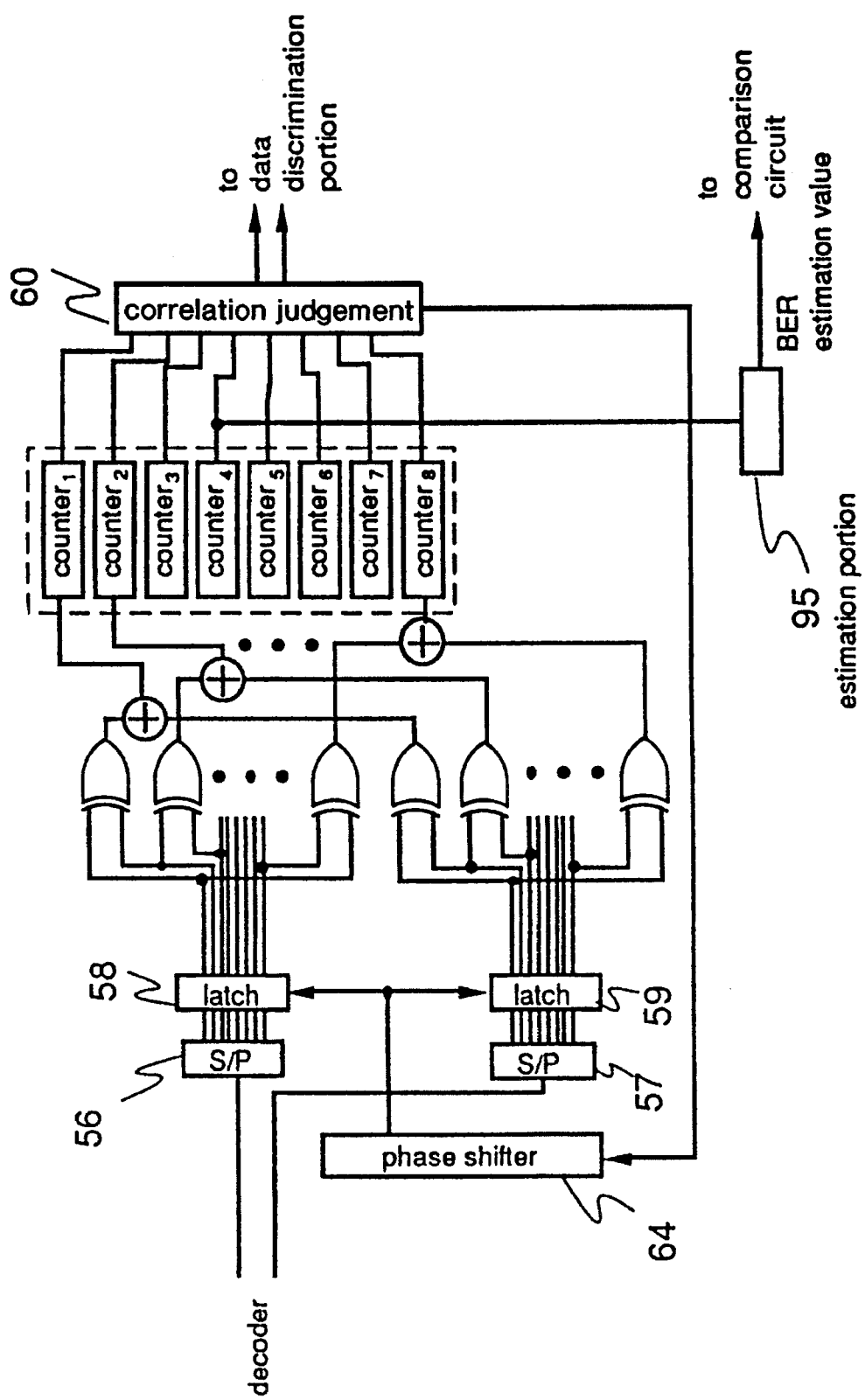
FIG. 15 shows one example of construction of the bit error rate estimation means.

FIG. 15 shows a circuit construction on the periphery of bit error rate estimation means 95. Similar to the aforementioned case, sampling point P5 of the bit error rate estimation means is designated as the timing point, lo and the output of counter 4 expresses the correlation between sampling points P4 and P5 and corresponds to ΔBER. Thus, the estimation means 95 can estimate the bit error rate at the timing point through a predetermined numerical operation on the correlation value from counter 4.

Also in this case, as the estimation means 95, any means may be used if it can perform conversion based on statistic values for giving relations between a correlation value measured in advance and ΔBER and between ΔBER and the timing point. That is, a logic circuit may be constructed based on the aforementioned statistic values, or numerical operations by a microcomputer or the like means may be used.

On the other hand, bit error rate estimation means 97 stores a series of data decided in advance for measuring bit error rates and measures bit error rates by extracting the aforementioned series of data for measuring bit error rates inserted in a modulation wave at a predetermined interval using a demodulated signal and comparing them with the stored series of data.

Accordingly, the AFC circuit of this invention is constructed to compare a bit error rate estimation value with a measured value and supply to VCXO 30 the voltage necessary for minimizing both the values adding it to the output of conventional AFC circuit 27. Therefore, it becomes possible to detect and correct frequency drift not only on receiving the preamble signal but also for a period until the next preamble signal will reach.

Although this invention has been described only on the application to a digital demodulator of the type of performing base band delay detection to a phase modulation wave, it is not limited to such a type. Namely, it is possible to use any type of digital demodulator if it can be used in the system for modulating and demodulating digital signals. For example, this invention can also be applied to demodulator of the type of frequency modulation or of amplitude modulation.

In addition, the process from the modulation wave to decoding may be constructed by any known system. For example, in a synchronous detection type demodulator, this invention can be applied to complement the phase difference between the preamble signal and the next preamble signal.

In the above embodiments, an XOR gate has been used for detecting correlations. However, it is also possible to construct such means with an NXOR gate or the like circuit if it can discriminate the case in which the two input values are the same from the case in which they are different.

Also in the above embodiments, the timing point has been decided by detecting correlations of detected and decoded digital signals (X, Y). However, for example, in case of changing the system of FIG. 1 into the construction for performing A/D conversion to the signal having passed through LPF 5, 6 after delay detection, it also becomes possible to detect correlations of signals not digitized but subjected to delay detection. In that case, since the magnitude of correlations corresponds to that of results from the multiplication between sampling data for the respective sampling points, a multiplier may be used as the correlation detection means. Accordingly, it should be understood that it is also possible to detect correlations of base band signals (I, Q, ΔΦ) or the digitized signals thereof (multivalued digital signals) in the synchronous detection method.

Furthermore, the above embodiments have been constructed to estimate the bit error rate based on the correlation value of the two sampling points in the vicinity of the timing point with the number of sampling points fixed at eight per one symbol. It is also possible to increase or decrease the number of sampling points considering the precision or the like factors. In addition, it is also possible to estimate the bit error rate based on the distribution of correlation values of sampling points other than those at or near the timing point.

As stated above, since the present invention makes it possible to detect the timing point in the demodulation process in a short time with the timing point corresponding to the point at which the eye pattern opens most widely, the occurrence of bit errors can be minimized against the phase shift due to noises or fading near the zero-crossing point.

Since the insertion of a specific signal in the modulation data becomes unnecessary, the bit error rate can be estimated without degrading the communication efficiency and any affection to the demodulation.

Additionally, it also becomes possible to make corrections at high speed and with high precision even in case of occurrence of relatively large frequency drift.

I claim:

1. A clock recovering circuit used for a digital demodulator detecting a modulation wave using predetermined detection means based upon a timing clock signal comprising:

correlation detection means for sampling demodulated data at a plurality of sampling data fixed in advance for each unit data cycle and detecting correlations between each adjacent pair of sampling data; and correlation judgment means for comparing the correlations detected by said correlation detection means of a first unit data cycle, for judging the pair of sampling data which maximize the correlation and another pair of sampling data providing the next largest correlation of a second unit data cycle, and for producing said timing clock signal based upon the sampling data which is a common sampling data with respect to said two pairs of sampling data providing said largest correlation and said next largest correlation.

2. A clock recovering circuit according to claim 1 further comprising:

a phase shift means for shifting the phase of said demodulated data so as to equalize the correlations of said two pairs of sampling data, whereby said timing clock signal, which is produced by said common sampling data, is always generated at a point at which an eye pattern of said demodulated data opens most widely.

3. A clock recovering circuit according to claim 1 further comprising a delay detection means for detecting a phase difference between two consecutive demodulated data provided before said correlation detection means.

4. A clock recovering circuit according to claim 1 further comprising a decoding circuit means for detecting the phase difference between two consecutive demodulated data provided before said correlation detection means.

* * * * *